(12) United States Patent
Simmons et al.

(10) Patent No.: US 8,605,623 B2
(45) Date of Patent: Dec. 10, 2013

(54) DETERMINING AND CONFIGURING A COMMUNICATION PATH IN A NETWORK

(75) Inventors: Ian M. Simmons, Hassocks (GB); David J. Woolgar, Horsham (GB); Norbert N. Eigeldinger, Villingen (DE); Rainer G. Zwing, Vs-Villingen (DE); Paul D. Wolf, San Carlos, CA (US)

(73) Assignee: Koninklijke Philips N.V., Eindhoven (NL)

( * ) Notice: Subject to any disclaimer, the term of this patent is extended or adjusted under 35 U.S.C. 154(b) by 2235 days.

(21) Appl. No.: 10/159,718

(22) Filed: May 31, 2002

(65) Prior Publication Data

US 2003/0223377 A1    Dec. 4, 2003

(51) Int. Cl.
  *H04L 12/28* (2006.01)
(52) U.S. Cl.
  USPC .................................... 370/255; 370/230.1
(58) Field of Classification Search
  USPC ............. 370/254, 408, 230.1, 231, 255, 256, 370/257, 258, 400
  See application file for complete search history.

(56) References Cited

U.S. PATENT DOCUMENTS

| | | | | |
|---|---|---|---|---|
| 5,504,747 | A * | 4/1996 | Sweazey ........................ | 370/403 |
| 5,732,086 | A * | 3/1998 | Liang et al. .................... | 370/410 |
| 5,940,376 | A * | 8/1999 | Yanacek et al. ................ | 370/250 |
| 5,953,316 | A * | 9/1999 | Lazar et al. .................... | 370/230 |
| 5,999,531 | A * | 12/1999 | Ferolito et al. ................. | 370/390 |
| 6,111,858 | A * | 8/2000 | Greaves et al. ................ | 370/256 |
| 6,934,283 | B1 * | 8/2005 | Warner ......................... | 370/380 |
| 6,934,612 | B2 * | 8/2005 | Remboski et al. .............. | 701/36 |
| 6,990,101 | B1 * | 1/2006 | Chow et al. .................... | 370/392 |
| 7,088,398 | B1 * | 8/2006 | Wolf et al. ................. | 348/423.1 |
| 2002/0186662 | A1 * | 12/2002 | Tomassetti et al. ........... | 370/254 |
| 2003/0179701 | A1 * | 9/2003 | Saleh et al. .................... | 370/216 |
| 2004/0081175 | A1 * | 4/2004 | Wall et al. ..................... | 370/397 |
| 2004/0264505 | A1 * | 12/2004 | Miki et al. .................... | 370/469 |

FOREIGN PATENT DOCUMENTS

WO    WO0031925    2/2000

\* cited by examiner

*Primary Examiner* — Kwang B Yao
*Assistant Examiner* — Nguyen Ngo
(74) *Attorney, Agent, or Firm* — Larry Liberchuk

(57) ABSTRACT

A method is disclosed to determine the topology of a network comprising a master node and one or more slave nodes interconnected using unidirectional data connections. The master node makes available data to succeeding nodes, and a slave node reads data from a preceding node, the read data comprising information of a path from master node to the slave node. A further method is disclosed to configure the path by sending data from the slave node to all nodes on the path via bi-directional data connections between nodes.

20 Claims, 6 Drawing Sheets

DETERMINING AND CONFIGURING A COMMUNICATION PATH IN A NETWORK

The present invention relates to a communications network and in particular to methods for determining and configuring path routing within a network of home entertainment components.

Networks are attractive as a means to share resources connected to the network among other nodes on the network. This is not only true for the IT market but also in consumer electronics (CE) where, for example, a TV is typically shared by (networked or 'clustered' with) several components, such as DVD, set top box, VCR, each capable of supplying content for presentation by the TV.

Networks used in IT typically employ routing management schemes which aim to optimise path lengths, times and/or to overcome node/connection failures. In the consumer electronics (CE) market minimising implementation cost is paramount and solutions used for IT can be too comprehensive and costly and thus are not usually deployed. In a CE cluster (network) what is required is a means to allow a component to connect (or disconnect) from the network in an ad-hoc way (known as 'hot plugging') and to identify easily a signal path from a component to a master node, typically a presentation device such as a TV.

To determine the topology of a network comprising a set of interconnected nodes a basic requirement is to identify the nodes and the connections between nodes and then to distribute this information. Some methods employ bidirectional connections between nodes to enable nodes to discover their neighbours and thereby contribute to determining the topology of the network. International application WO 00/31925 assigned to Net Insight discloses a method to determine the topology of a network of nodes that are interconnected via unidirectional connections. An attraction of such an approach is that implementation cost is less than for schemes utilising bi-directional connections.

The method of WO 00/31925 discloses a process of topology discovery which involves determining the existence of one or more loops within a network of nodes, wherein a node transmits a topology discovery message, a version of which it subsequently receives (after being forwarded by one or more intermediate nodes). From this feedback the node can deduce the existence of a path from itself to any of the identified set of intermediate nodes. However, a disadvantage of the method is that the originating node must receive the feedback message to determine the existence of the path and all the nodes thereon. A further disadvantage is that the originating node must then distribute this information to those nodes on the path to facilitate any subsequent setting up of a path. A yet further disadvantage is that if the distribution uses the unidirectional connections then an additional message overhead burden results. Furthermore, should a unidirectional connection break somewhere on the path (for example, due to hot plugging a component) there may not be a way of communicating with and informing all the nodes on the path.

The method of WO 00/31925 also discloses a method to automatically detect when a break occurs in a previously determined path by means of a node transmitting regular verification messages to traverse the path discovered; a break being determined when the node fails to receive the verification message after a certain period of time. This method has the disadvantages that message traffic overhead is increased and it fails to identify where on the path the breakage has occurred.

It is an object of the present invention to solve these and other problems using methods to determine the topology of a home entertainment system and configure a path between components of said system.

In accordance with the present invention there is provided a method to determine the topology of a network, the network comprising a master node and at least one slave node interconnected by means of unidirectional data connections, wherein the master node is operable to connect via a first port to a first immediately succeeding slave node and to make available data for reading by said first immediately succeeding slave node, and wherein said data is adapted in dependence on the identity of said first port, the method comprising the steps of, for a slave node operable to connect via a second port to a second immediately succeeding node:

a) reading data from an immediately preceding node;
    b) adapting the data in dependence on the identity of said second port; and
    c) making available the adapted data for reading by said second immediately succeeding node, such that the adapted data discloses to a succeeding node in the network a path from a preceding node in the network up to and including the slave node.

Networks suited to implement the method of the present invention include those with a master node and one or more slave nodes. Suitable network topologies include, but are not limited to, star (with the master as hub), tree and branch (with the master as root), ring, and combinations of tree and star; and wherein the network provides unidirectional communication from the master node to a slave node (including via intermediate slave nodes).

A slave node reads data from an immediately preceding node. A slave node may have one or more immediately preceding nodes. The data read may include the identity of the connection between the slave node and the immediately preceding node; in addition the identity of the immediately preceding node may also be provided. Preferably, in order to minimise data, where the slave node has only one immediately preceding node, the data may comprise the output port identity of the immediately preceding node, this being sufficient to identify the connection. In general, the data may comprise an ordered set of output port identities, corresponding to all nodes on the path the data has traversed to reach the slave node. The slave node then adapts the data by, for each output port that may connect to an immediately succeeding node, appending to the data (ordered set of output port identities) the respective output port identity and making the adapted data available for reading by an immediately succeeding node via the respective port of the slave node.

An advantage of the present invention is that a slave node present within a suitable network discovers topology information by polling (reading) an immediately preceding node. As described above and in normal use, the information so read comprises data describing the entire path between the master and the slave node. However, unlike prior art methods, the immediately preceding node does not transmit the information to the slave node but relies on the information being requested; this mechanism therefore may allow the slave node to determine that it is unable to read an immediately preceding node—and the slave node may thereby deduce that the immediately preceding node is either not connected and/ or that there exists a connection problem between the immediately preceding node and the slave node. It can forward this information for use by other nodes in the network. When a slave node detects such a connection problem it may set data to a default null value to substitute for the data that could not be read. This value can then be propagated in the normal way to succeeding nodes of the slave node. By reading data which contains a null value, a succeeding node can determine there is a break and where the break resides. In case such a node is presently active in the system (for example streaming AV content to the master node) the node may be able to signal to other nodes in the network the presence and location of the break; these other nodes may in turn be able to reconfigure the path so as to re-instate the connection to the master and thereby continue service with minimal interruption and/or user involvement. In any event, the user can be informed of the location of the break. This mechanism is further elaborated below.

In accordance with a further aspect of the present invention there is provided a method to configure a path between a master node and a slave node of a network in which the topology of nodes within the network has been previously determined, the method comprising the steps of, for the slave node:
  a) reading data from an immediately preceding node;
  b) sending said data to at least every node along the path disclosed by said data;
and, for each such node along the path,
  a) receiving said data; and
  b) establishing a portion of the path in dependence on said data.

In some prior art methods data read from an immediately preceding node is simply forwarded by the slave node to the master node which, to configure the path disclosed by the data, then forwards the data to each and every node on the path. Such methods rely on the integrity of the path. A slave node according to the present invention may read data from an immediately preceding node and then may send the data directly to each and every node on the path disclosed by the data. Various connection schemes may be used to achieve the direct connection to the nodes of the path, including but not limited to, for wired, project50, IEEE1394 and Ethernet; and for wireless, ZigBee, HomeRF, WiFi, 802.11, Infrared remote control (including RC5/6, pulse position) and IrDA. All such schemes are well known to the person skilled in the art and will not be further elaborated. Preferably, the CEC bus of the HDMI specification is utilised for the direct connection to the nodes of the path. An advantage of the direct connection method is that the unidirectional connections between nodes are not utilised to forward configuration information, thereby simplifying the method by limiting the involvement of the unidirectional connections between nodes to the topology discovery task.

The above method to configure a path may be deployed after using the method to determine the topology of nodes described earlier; this has an advantage in improving the handling of breaks in the path. When configuring a path, a node on the path receives the data from the slave node and configures a portion of the path in dependence on said data. For example, in normal operation where the data describes the path from master to the slave node, the receiving node may switch its respective input and output ports in order to correspond with the received data. Alternatively, where the data discloses a break in the path a node receiving the data may configure itself in a different way to, in conjunction with other nodes, help establish a new path between master and slave nodes to circumvent the break. For example, a succeeding node relative to the break may have access to an alternative path to the master and may make available data corresponding to this alternative path at its output ports. Succeeding nodes lying on the remaining intact portion of the original path to the slave node may re-read the data from preceding nodes and thereby provide to the slave node data of a new intact path to the master node. To invoke the new path, the slave node sends data to the nodes of the new path in the normal fashion, as described earlier. In this way a path between the master node and slave node may be re-established. Preferably, the slave node sends the data read from a preceding node to all other nodes of the network.

According to a further aspect of the present invention there is provided a network comprising a master node and at least one slave node interconnected by unidirectional data connections whereby the flow of data is in a direction away from the master node towards the at least one slave node, wherein a node makes available data at an output port for reading by an immediately succeeding node, the data being adapted in dependence on the identity of said output port such that when a slave node reads data from an immediately preceding node, said data comprises the identity of an output port of said immediately preceding node.

In the context of consumer electronics, a suitable system according to the present invention may comprise a presentation component acting as a master node, for example but not limited to a display, audio amplifier or TV. Slave nodes may be connected to the master node directly or via one or more intermediate slave nodes. Examples of slave nodes include, but are not limited to set top box, DVD player, DVD recorder, VCR, PVR, audio cassette recorder and CD player. Preferably, the unidirectional data connections are according to the DDC bus as defined in the HDMI specification. The nodes of the system may in addition be interconnected via a common bi-directional link. This link may be wired or wireless or a combination of the two. Suitable methods include, but are not limited to, for wired, project50, IEEE1394 and Ethernet; and for wireless, ZigBee, HomeRF, WiFi, 802.11, Infrared remote control (including RC5/6, pulse position) and IrDA. Preferably, the common bi-directional link is according to the CEC bus as defined in the HDMI specification.

A master node may comprise a first port to connect to an immediately succeeding node, a data processor to make available data in dependence on the first port for reading by the immediately succeeding node and a second port to receive data from a slave node of the network. Preferably, the master node interconnects to the network using HDMI wherein the first and second ports interface, respectively, to the DDC bus and CEC bus of HDMI.

A slave node may comprise a first port operable to connect to an immediately preceding node, a second port operable to connect to an immediately succeeding node and a data processor operable to read data from said immediately preceding node via the first port, to adapt said data in dependence on the identity of the second port and to make available the adapted data for reading by said immediately succeeding node. The slave node may also comprise a third port to exchange data with another node of the network. Preferably, the slave node interconnects within the network using HDMI, wherein the first port and second ports interface to the DDC bus of HDMI and the third port interfaces to the CEC bus of HDMI.

Further features and advantages will now be described, by way of example only, with reference to the accompanying drawings in which.

Within the present description the term 'node' refers to an element within a network. The term 'HDMI' refers to the emerging High Definition Multimedia Interface and any derivatives thereof. In relation to a slave node, the term 'immediately preceding node' refers to a node connected to a node input of the slave node, a 'preceding node' being connected to a respective node input of the immediately preceding node (possibly via one or more intermediate nodes); similarly, the term 'immediately succeeding node' refers to a node connected to a node output of the slave node, a 'succeeding node' being connected to a respective node output of the immediately succeeding node (possibly via one or more intermediate nodes).

Figure 1:
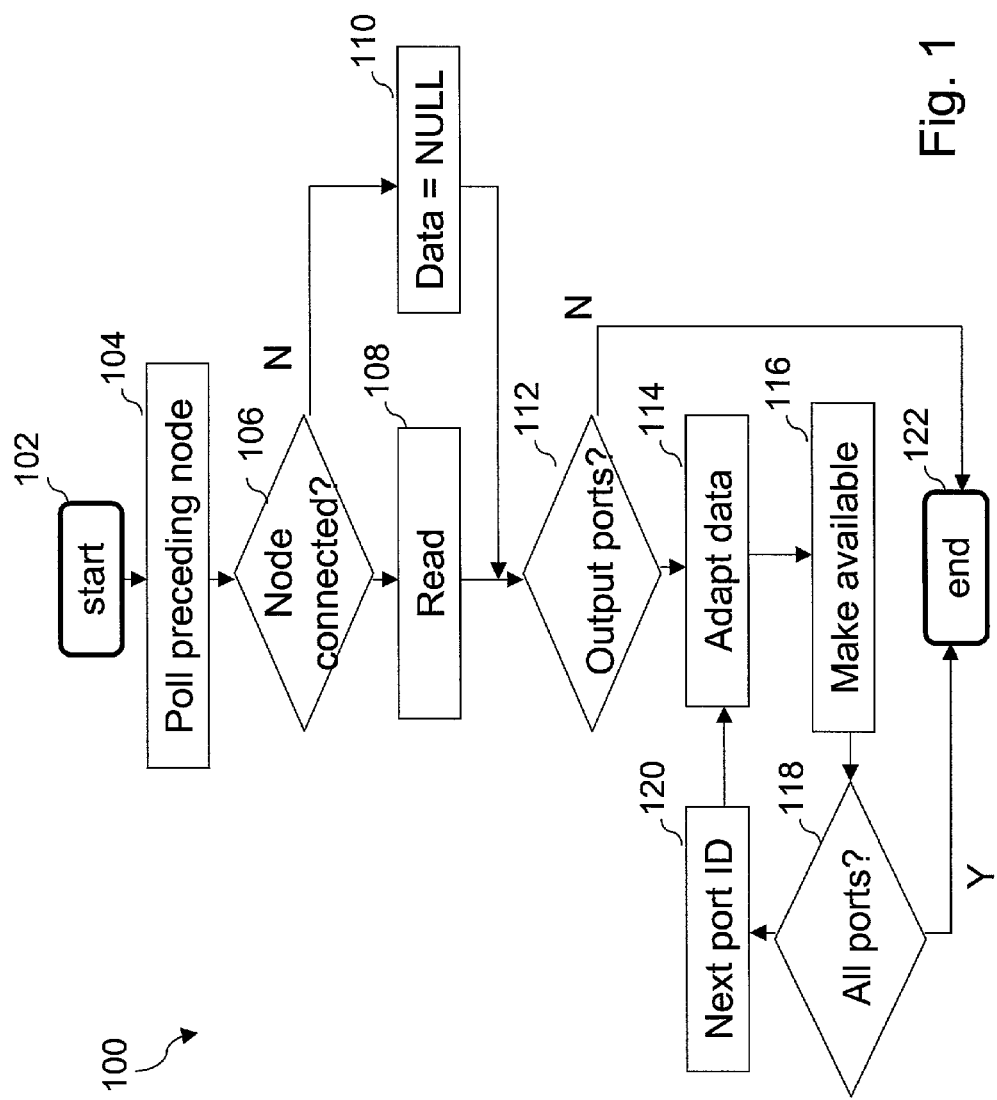
FIG. 1 is a flow diagram of a first method embodying the invention.

FIG. 1 shows a flow diagram of a first method embodying the invention and is shown generally at 100. The method is used by a slave node of a network and starts at 102. The slave node polls 104 an immediately preceding node. Based on the success, or otherwise, of the polling, the slave node can determine at 106 whether an immediately preceding node is connected (or the connection to the node may be broken). Where the polling is successful, the slave node reads 108 data from the immediately preceding node; where the polling was unsuccessful, the slave node loads a NULL value 110 to substitute for the absence of read data. At 112 the slave node checks its output ports and, for each port, it adapts 114 the read data (or NULL data) for example by appending the relevant port ID, and makes available 116 the adapted data for reading (by an immediately succeeding node) at the respective port. It then checks 118 whether all output ports have been processed, and if not, continues by processing the next port ID 120. The method ends at 122.

Figure 2:
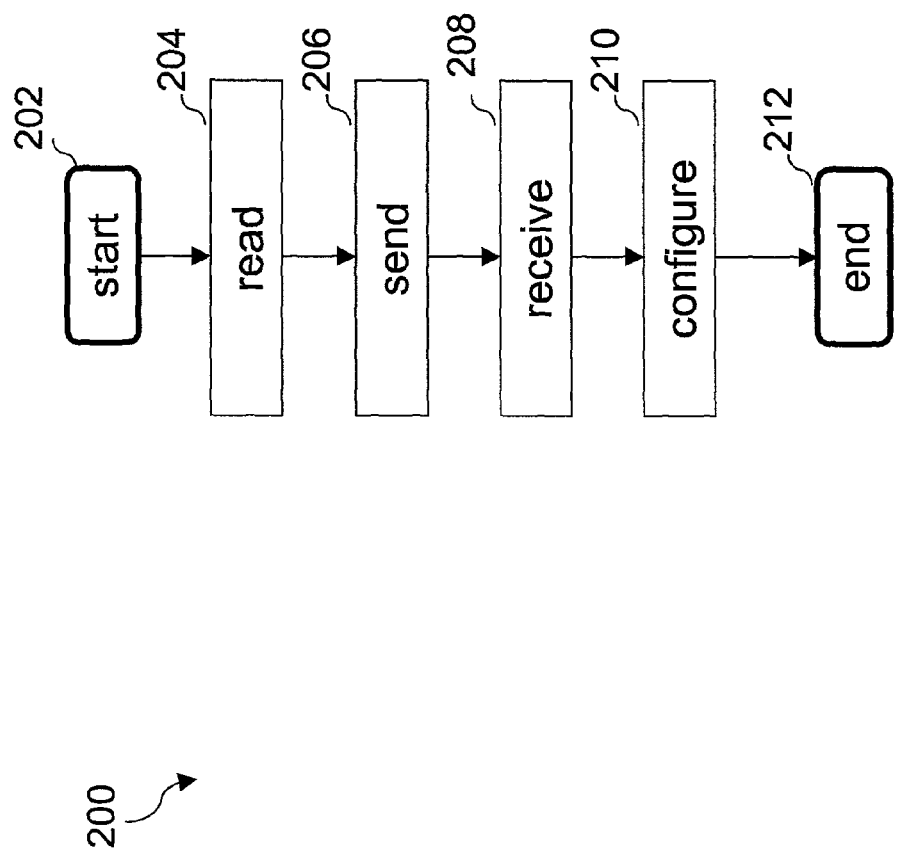
FIG. 2 is a flow diagram of a second method embodying the invention.

FIG. 2 is a flow diagram of a second method embodying the invention and is shown generally at 200. The method relates to configuring a previously identified path between a master node and a slave node. The method starts at 202 and at 204 the slave node reads data from an immediately succeeding node. The slave node then sends 206 this data to at least all the other nodes on the path (as identified by the data) between the master node and the slave node. A node on the path receives 208 the data and performs a configuration of a portion of the path 210 in dependence on the data. The method ends at 212.

Figure 3:
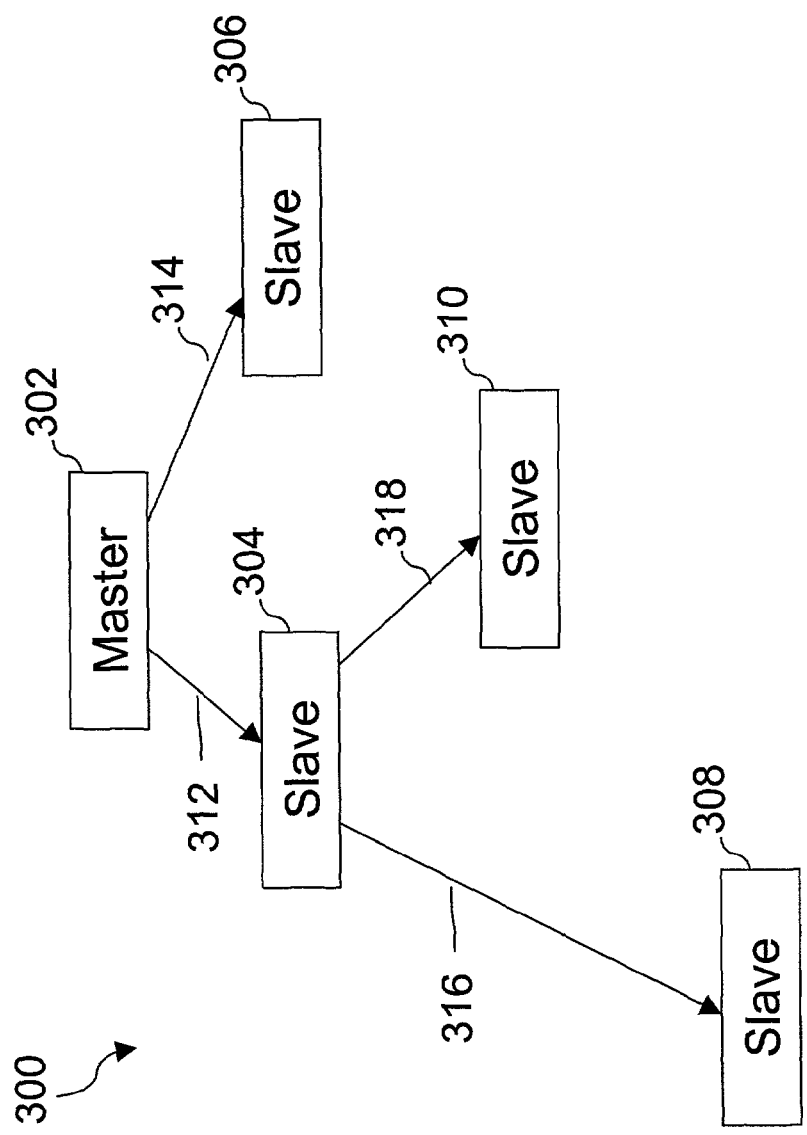
FIG. 3 is a schematic representation of a first network embodying the invention.

FIG. 3 is a schematic representation of a first network embodying the invention. The network is shown generally at 300 and comprises a master node 302 connected by unidirectional connections 312 and 314 to slave nodes 304 and 306 respectively. Slave node 304 is further connected by unidirectional connections 316 and 318 to slave nodes 308 and 310 respectively. The schematic shows the general flow of data outward from the master node.

Figure 4:
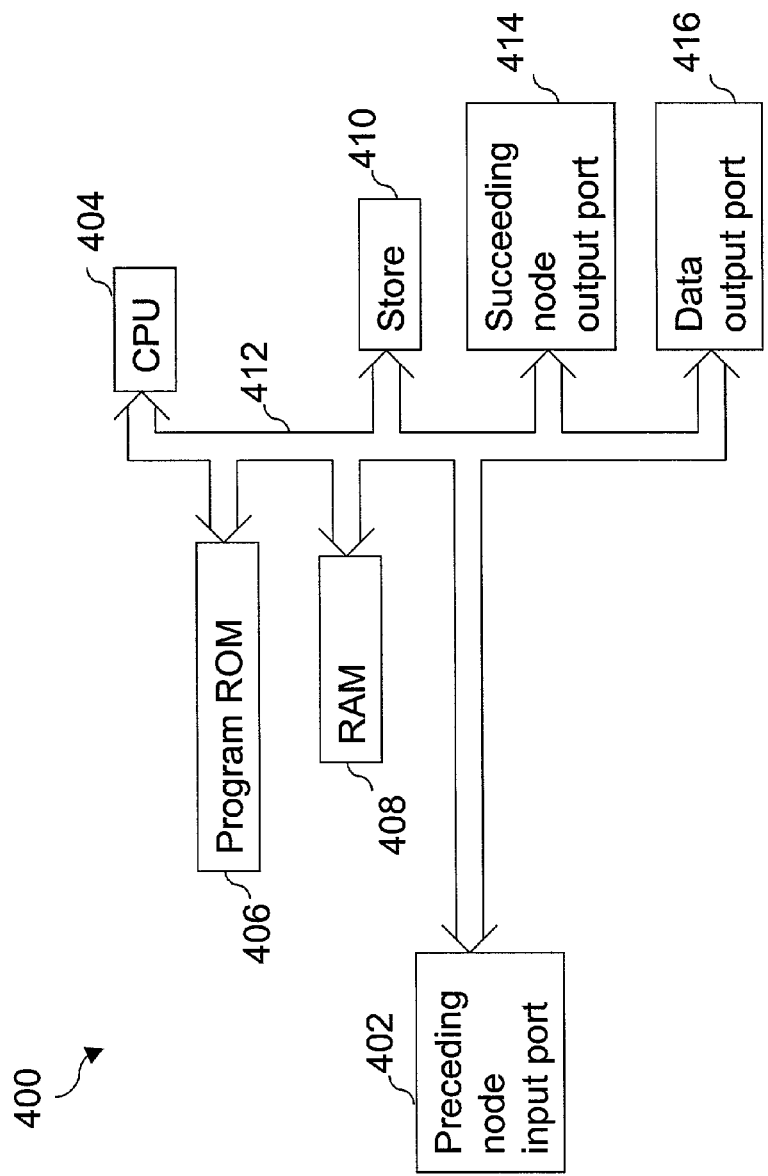
FIG. 4 is a schematic representation of a slave node of a network embodying the invention.

FIG. 4 is a schematic representation of a slave node of a network embodying the invention. The slave node is shown generally at 400 and comprises a first port 402 to connect to an immediately preceding node, a data processing unit (comprising CPU 404, Program ROM 406, RAM 408 interconnected via bus 412 in known manner to the skilled person), a store 410, a second port 414 to connect to an immediately succeeding node and a third port 416 to send data to other nodes in the network. In operation, the data processing unit reads data from an immediately preceding node via the first port, stores the data in store 410, adapts and stores 410 the adapted data and makes the adapted data available for reading by an immediately succeeding node via the second port. The read data is sent by the data processing unit to other nodes in the network via the third port.

Figure 5:
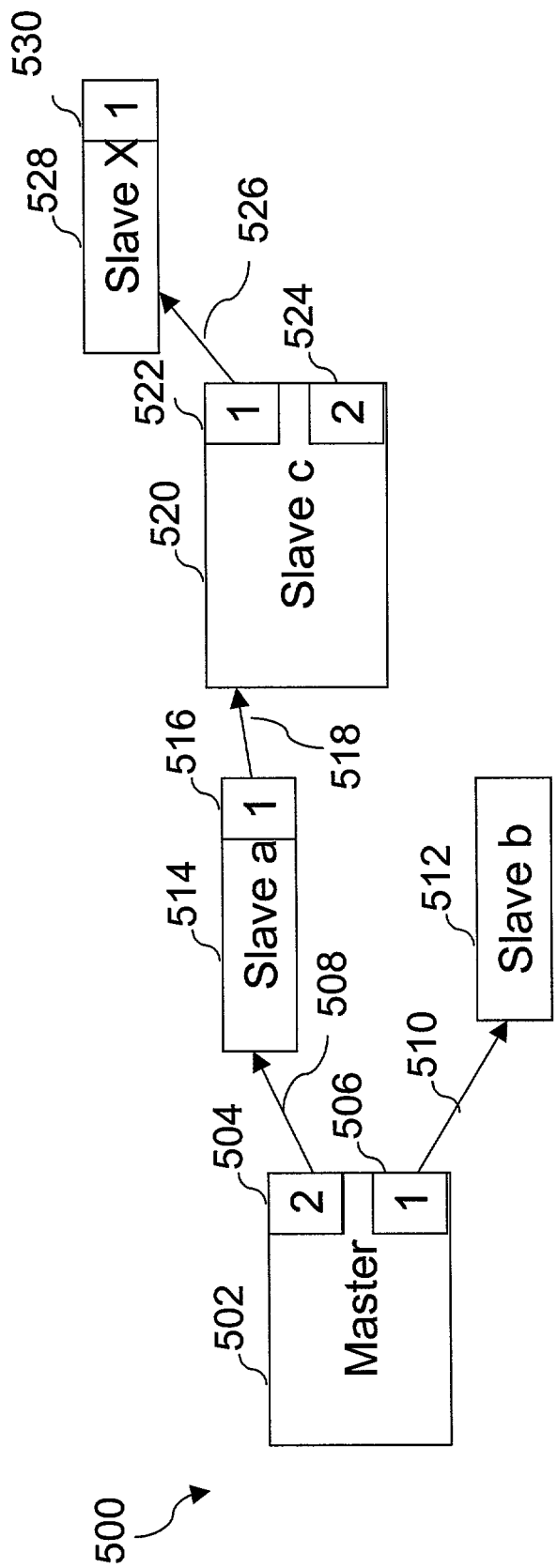
FIG. 5 is a schematic representation of a second network embodying the invention.

FIG. 5 is a schematic representation of a second network embodying the invention and is shown generally at 500. The network has a tree topology and comprises a master node 502, slave node a 514, slave node b 512, slave node c 520 and slave node X 528. Slave node a 514 reads data 508 from master node 502, wherein data 508 comprises parameter "2" corresponding to the ID of port #2 504 of the master node 502. In similar fashion, slave node b 512 reads data 510 from master node 502, wherein data 510 comprises parameter "1" corresponding to the ID of port #1 506 of the master node 502. Slave node c 520 reads data 518 from slave node a 514, wherein data 518 comprises parameter "2.1", corresponding to data 508 adapted with the ID of port #1 516 of slave node a 514. Likewise, slave node X 528 reads data 526 from slave node c 520, wherein data 526 comprises parameter "2.1.1", corresponding to data 518 adapted with the ID of port #1 522 of slave node c 520. Slave X adapts data 526 with the ID of port #1 530 and makes this adapted data available to any slave node that might connect to port #1 530 of slave node X 528; similarly for slave node c 520 which would adapt data 518 for port #2 524.

Should Slave X wish to configure a path to the master node, it simply sends the parameter "2.1.1" to at least the master node 502, slave node a 514 and slave node c 520. Each of these nodes receives the parameter and can configure its portion of the path simply by decoding and acting on the relevant part of the parameter. For example, the leftmost digit is recognised by the master node and it will select its port #2 504 accordingly. In similar fashion, the combination of leftmost and middle digit (i.e. 2.1) is recognised by slave node a 514 as referring to it since it comprises received data 508 adapted with its output port #1; thus, it will select its port #1 516 accordingly. Finally, the combination of all digits (i.e. 2.1.1) is recognised by slave node c 520 as referring to it and it will select its port #1 522 accordingly.

Figure 6:
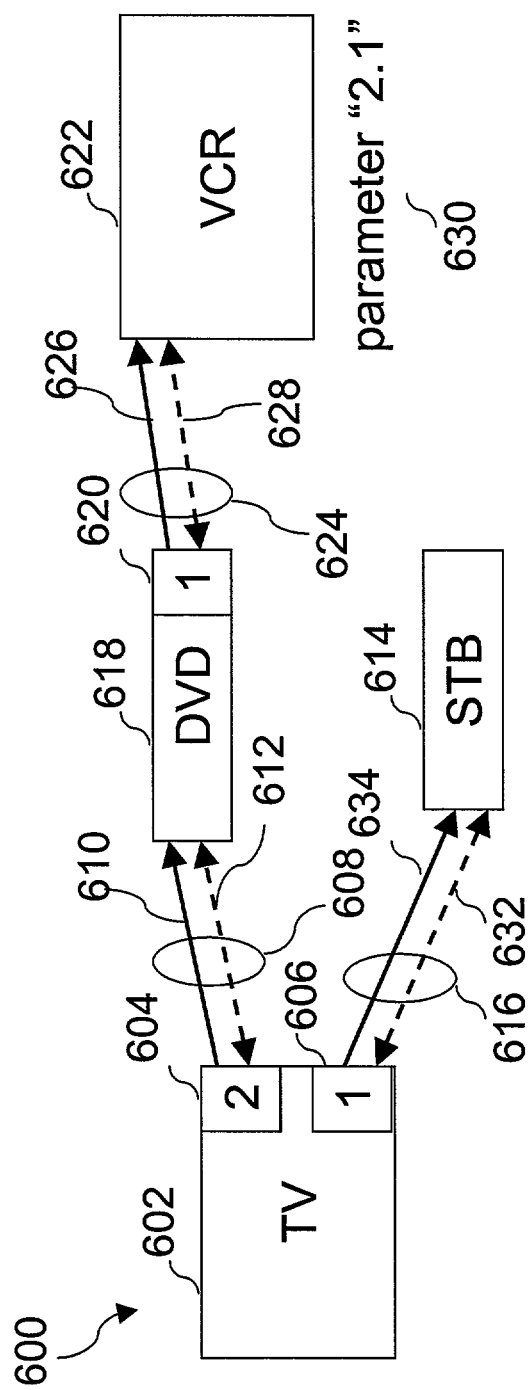
FIG. 6 is a schematic representation of a system of home entertainment components embodying the invention.

FIG. 6 is a schematic representation of a system of home entertainment components embodying the invention. The system is shown generally at 600 and comprises a TV 602, a DVD player 618, a set top box (STB) 614 and a VCR 622. The components are interconnected using HDMI cordsets 608, 616 and 624. The TV 602 is the master node, the other components acting as slave nodes. The TV makes available data, in dependence on its port IDs, for reading at its output ports 604 and 606 respectively. The data available at TV port #2 604 is read by DVD player 618 using the DDC line 610 within the HDMI cordset 608. The data read by DVD player 618 is parameter value "2" corresponding to master node port #2 (as discussed earlier in relation to FIG. 5). (Similarly, data available at TV port #1 606 is read by STB 614 via the HDMI cordset 616.) VCR 622 reads data from DVD player 618 using the DDC line 626 in HDMI cordset 624; the data read being parameter value "2.1" 630 corresponding to data read by the DVD player and adapted according to DVD player port #1. To set up the path to the TV 602, the VCR 622 simply broadcasts parameter "2.1" 630 to the TV 602 and DVD player 618 using the CEC bus (628, 612, 632 of the HDMI cordsets 624, 608 and 616 respectively). The TV and DVD player configure their input and output ports according to the received data parameter "2.1" as described earlier.

The foregoing implementations and methods are presented by way of example only and represent a selection of a range of implementations that can readily be identified by a person skilled in the art to exploit the advantages of the present invention.

In the description above and with reference to FIG. 6, a method is disclosed to determine the topology of a network 600 comprising a master node 602 and one or more slave nodes 614, 618, 622 interconnected using unidirectional data connections 610, 628, 634. The master node 602 makes available data to succeeding nodes and a slave node 622 reads data from a preceding node 618, the read data comprising information of a path from master node to the slave node. A further method is disclosed to configure the path by sending data from the slave node 622 to all nodes on the path via bi-directional data connections 628, 612, 632 between nodes. In a preferred embodiment, a home entertainment system 600 employing HDMI is a suitable network and comprises a presentation component, for example a TV 602, operable to function as the master node; the nodes of the network being interconnected using HDMI cordsets 608, 624, 616. The HDMI specification comprises the DDC bus to support the above mentioned unidirectional data connections 610, 628, 634 and the CEC bus to support the above mentioned bi-directional data connections 628, 612, 632.

The invention claimed is:

1. A method to determine a topology of a network, comprising:
   interconnecting a master node and at least one slave node by unidirectional data connections, wherein the master node is operable to connect to a first immediately succeeding slave node via one of the unidirectional data connections, and to make available data for reading by said first immediately succeeding slave node via the one unidirectional data connection;
   reading data from an immediately preceding node by a slave node, said slave node including a first port adapted for connecting to the immediately preceding node via a unidirectional data connection for reading the data and a second port adapted for connecting to a second immediately succeeding node via another unidirectional data connection, and re-reading the data from an immediately preceding node if the topology of nodes within the network has been previously determined and an input signal to the node indicates that a network configuration has changed;
   adapting, by said slave node, the data in dependence on an identity of said second port; and
   making available the adapted data for reading by said second immediately succeeding node via the second port, such that the adapted data discloses to a succeeding node in the network a path from a preceding node in the network up to and including the slave node.

2. The method according to claim 1, wherein if the slave node is not connected to an immediately preceding node, setting the data to a default null value.

3. A method to configure a path between a master node and a slave node of a network in which a topology of nodes within the network has been previously determined, the method comprising:
   reading data by the slave node from an output port of an immediately preceding node via a unidirectional data connection for reading data from the immediately preceding node, said data adapted by the immediately preceding node in dependence on an identity of the immediately preceding node's output port connecting to the slave node;
   receiving by the slave node an indication that a network configuration has changed and re-reading said data from the immediately preceding node to determine the changed network configuration;
   sending said data by the slave node to at least every node along the path disclosed by said data via a common bi-directional link; and,
   for each such node along the path,
      receiving said data; and
      configuring each such node's input and output ports to establish a portion of the path in dependence on said data.

4. A network of a topology of nodes comprising:
   a master node operable to connect by unidirectional data connections to at least one slave node, wherein the master node connects to a first immediately succeeding slave node via one of the unidirectional data connections and makes available data for reading by said first immediately succeeding slave node via the one unidirectional data connection; and
   a slave node including
      a first port adapted for connecting to an immediately preceding master node or slave node via a unidirectional data connection for reading data from the immediately preceding master node or slave node through the first port, and
      a second port adapted for connecting as an output port to a second immediately succeeding slave node via another unidirectional data connection, wherein
   the slave node adapts the data in dependence on an identity of the second port as the output port, and makes available the adapted data for reading by said second immediately succeeding slave node via the second port, such that the adapted data discloses to a succeeding node in the network a path from a preceding node in the network up to and including the slave node by said data comprising the identity of an output port of each immediately preceding node, and re-reads said data from the immediately preceding node upon receiving an indication that a network configuration has changed to determine the changed network configuration.

5. A network according to claim 4 wherein the unidirectional connections are according to a DDC bus as defined in a HDMI specification.

6. A network according to claim 5, wherein said network is included in a home entertainment system that comprises a presentation component operable to function as the master node.

7. A network according to claim 4 wherein all nodes are further interconnected by a common bi-directional link.

8. A network according to claim 7 wherein the common bi-directional link is according to a CEC bus as defined in a HDMI specification.

9. A network according to claim 8, wherein said immediately succeeding node, by operation of a control signal, reads said data from said immediately preceding node utilizing said unidirectional data connections.

10. A network according to claim 4, further including a master node that comprises a first port operable to connect to an immediately succeeding node by a unidirectional data connection, said first port further operable to connect to an immediately succeeding node by a bi-directional data connection, a data processor operable to make available data in dependence on the first port for reading by the immediately succeeding node via the unidirectional data connection.

11. A network according to claim 10, wherein the first port is operable to interface to a DDC bus of a HDMI specification as the unidirectional data connection and further is operable to interface to a CEC bus of the HDMI specification as the bi-directional data connection.

12. A network according to claim 4, wherein the slave node further comprises a data processor operable to read data from said immediately preceding node via the first port, to adapt said data in dependence on the identity of the second port and to make available the adapted data for reading by said immediately succeeding node.

13. A network according to claim 12, further comprising a third port operable to exchange data with another node of the network.

14. A network according to claim 13, wherein the first port and the second port are operable to interface to a DDC bus of a HDMI specification and the third port is operable to interface to a CEC bus of the HDMI specification.

15. A method of identifying paths of a network that includes a plurality of nodes, the method comprising:
   providing a first node including an output port connected to a unidirectional data connection;
   providing a data item at this output port that includes an identification of this output port;
   providing a second node including an input port connected via the unidirectional data connection to the output port of the first node;
   reading the data item from the second node via the unidirectional data connection;
   storing the read data item as an identifier of a complete path from the first node to the second node;
   providing an output port of the second node;
   appending an identification of this output port of the second node to the read data item to form a new data item which identifies the output port of the first node and the output port of the second node; and
   making available the new data item at this output node of the second node; and
   receiving an indication that a network configuration has changed and re-reading the data item from the second node to determine the changed network configuration.

16. The method of claim 15, wherein
the output ports of the plurality of nodes are configured to interface to a DDC bus of a HDMI specification.

17. The method of claim 15, including
for each node other than the first node:
   providing, to each other node in the network, an identifier of this node and the identifier of the complete path from the first node to this node.

18. The method of claim 17, wherein
the identifier is provided via a CEC bus of a HDMI specification.

19. The method of claim 18, wherein
the output ports of the plurality of nodes are configured to interface to a DDC bus and a CEC bus of the HDMI specification.

20. The method of claim 15, wherein
the network is included in a home entertainment system.

* * * * *